June 22, 1926. Re. 16,365
A. J. KEMPIEN
INDICATOR
Original Filed Nov. 16, 1914
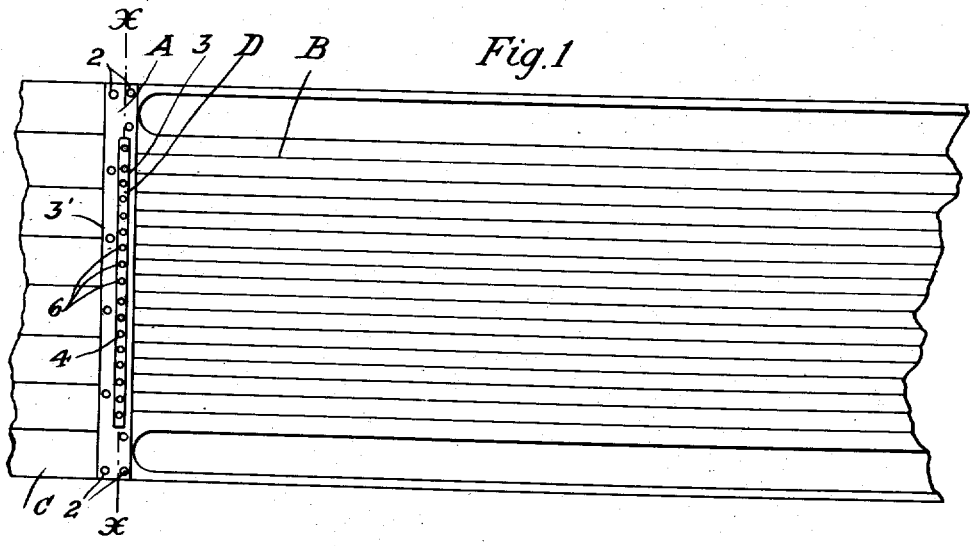
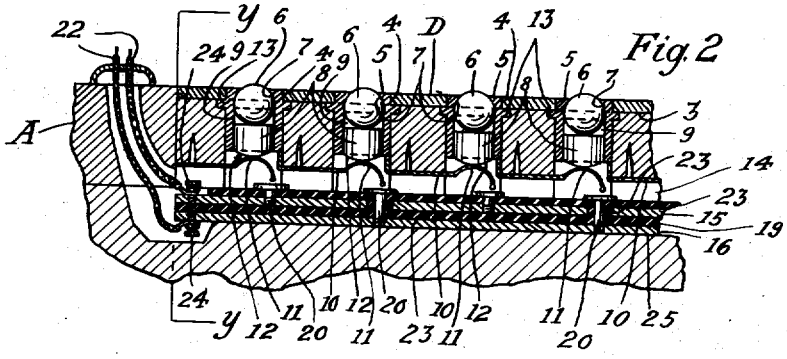
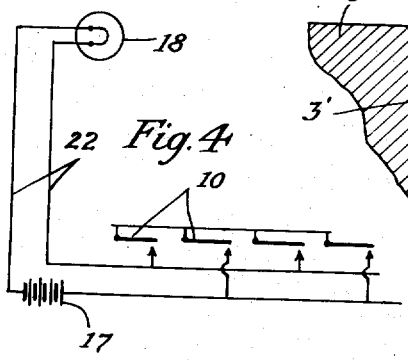
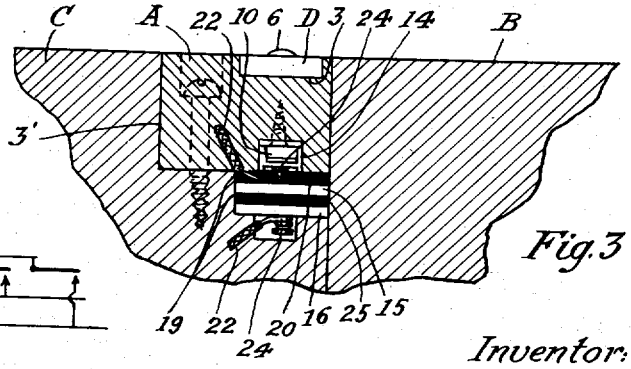
Inventor:
August J. Kempien.
By Howard Fuche,
his Attorney.

Patented June 22, 1926. Re. 16,365

UNITED STATES PATENT OFFICE.

AUGUST J. KEMPIEN, OF ST. PAUL, MINNESOTA.

INDICATOR.

Original application filed November 16, 1914, Serial No. 872,409. Renewed December 22, 1916, Serial No. 138,368. Original No. 1,317,020, dated September 23, 1919. Application for reissue filed September 17, 1921. Serial No. 501,451.

The object of this invention is to provide means for indicating when a player commits what is termed a "technical foul" in the game of bowling, by allowing his or her foot to extend, over and beyond the foul line while any portion of the foot rests on the alleyway. Various devices have been designed for accomplishing this result, but they have been found impracticable for use, because they are not dependable and frequently are actuated by the ball which is thrown by the player instead of being operated by the foot. My invention overcomes these objections and provides a simple, inexpensive and effective device for accomplishing the desired results.

In the accompanying drawing forming part of this specification, Figure 1 is a plan of a detail of a bowling alley near the player's end; Fig. 2 is a section of a detail taken upon the line X—X of Figure 1; Fig. 3 is a section of a detail taken upon the line Y—Y of Figure 2, and Figure 4 is a diagram illustrating the electric circuit employed.

It is customary to employ a foul line near the player's end of a bowling alley, and according to the rules and regulations adopted by players, to penalize a player, who steps over said line when throwing a ball, and when any portion of the foot rests upon the alley. My invention provides a device, which is placed in the floor of the alley and runways on the foul line or in proximity thereto, but which is made to operate, so as to indicate automatically by a signal when a player encroaches upon the line sufficiently to become penalized. An objection in the use of contact devices, is that the ball when thrown frequently comes into contact with the foul line, and operates the indicator when not desired. To overcome this objection, I provide a plurality of contact points or spots, contact with one of which is insufficient to operate the signal, it becoming necessary to depress two or more of the points in order to effect the signal. These points are placed near enough together so that the foot will operate them, but owing to the curvature of the periphery of the bowling ball, it is impossible for the ball to actuate more than one of the points at a time, which will not cause the signal to operate. As a result the signal or alarm push or actuating elements operate in multiple to actuate the signal, that is more than one of the push elements must be operated to effect signaling.

In the drawing, I have illustrated one form of my invention, it being understood that various designs embodying the principles employed can be used. A indicates a plate, which is mortised into and across the surface of the floor, dividing the alley way proper B from the runway C, said plate being set with its surface flush with the surface of said floor to which it is secured by means of the screws 2 or other suitable means. This plate is formed with a channel 3, extending longitudinally thereof, in which a strip D made of rubber, composition, wood or other suitable material is placed, having a series of openings 4 disposed in alinement with the foul line. The strip D can be of suitable color, so as to mark plainly the foul line and each of the openings 4 is designed to receive the head end of a bushing 5 made of metal or other suitable material containing a push piece in the form of a contact ball 6, the periphery of which projects slightly above the surface of the strip D and of the end of the bushing containing the ball. The bushing is formed with a seat 7 in its upper end against which the ball is pressed firmly by a plunger 8, which is slidably supported to move vertically in the passage 9 within the bushing, said plunger being urged upwardly by a spring switch arm 10, which is formed with a curved end 11, pressing upwardly against a convex surface 12 on the lower end of the plunger. The body of the switch arm 10 is secured firmly to the body of the plate A, which is set in the mortise groove 3′. The bushing 5 is provided with a circular shoulder 13 seated in the body of the plate A, over which the strip D is positioned to clamp the bushing firmly down in place in the body of the plate. The several contact devices, such as described are of similar construction, and are positioned in a row with the balls 6 upon the foul line. The position in which these contact devices are placed can be varied, and it is not essential that they be in exact alinement, it being obvious that they can be staggered or arranged in any manner desired, so long as the contact devices are made so that it requires the operation of two or more to effect the operation of the signal, which is employed in conjunction therewith. It will be apparent, that should a player step on any of the contact devices, the balls 6 are depressed, causing the switch arms 10 to be moved downwardly within the groove 14 in the plate A. The corresponding groove 25 below plate A in floor C is designed to contain a pair of bus-bars 15 and 16 acting as conductors for electric current, which is employed from a suitable source such as a battery 17 for operating a visual signal 18. These bus-bars are separated by a strip of insulating material 19, said bars being fastened together as a unit by means to be hereinafter described. In the construction shown the switch arms 10 are electrically connected through plate A when the latter is made out of metal. When said plate is made out of insulating material the switch arms 10 can be connected by wiring in any well known manner or through the metallic parts of the mechanism.

Below the free end of each switch arm 10, the head of a contact bolt 20 is spaced, whereby when the balls 6 are depressed the switch arms are forced into connection with the heads of the bolts 20 for the purpose of closing an electric circuit 22 passing through the bus-bars, signal and battery. The bolts 20 are arranged in series below the ends of the switch arms 10 and every alternate bolt makes connection with one bus-bar while the adjacent bolt or bolts make connection with the other bus-bar, thereby necessitating two switch arms to be depressed simultaneously into connection with the terminal bolts before the signal is energized. The bolts are turned into threaded engagement with the bus-bars, and the ones which pass through the bus-bar 15 and enter the bar 16 serve to clamp the bars with the intervening insulating strip 19 together. The terminal bolts, which clamp the terminal bars together are insulated from the bar 15 by insulating material 23. The ends of the bus-bars are connected to the ends of the circuit 22, such as by binding screws 24.

In operation should the player happen to step on the foul line two or more of the balls will be depressed, causing the corresponding switch arms 10 to be pressed into contact with the heads of the terminal bolts, thus closing a circuit through the signal 18 and indicating that the player has exceeded the rules of the game and committed a technical foul. A technical foul is one in which a player encroaches upon the alley way from the run way more than is permitted by the rules of the game. The signaling device is not operated when the bowling ball is thrown by the player and rolled over the foul line. The source of electric energy may be in the form of the battery as illustrated or may be derived from any power circuit or suitable source of electrical current. The signal may be of any form desired, the lamp illustrated being one form of visual signal, which can be employed. Any sound producing signal or other suitable signal may be used when desired. The apparatus may also be modified, and changed in construction, and need not be used with an electrical apparatus, the broad principle involved being the employment of a signal actuating device, in which it is necessary to actuate more than one actuating device on the foul line before the signal is operated, leaving the bowling ball which is used by the player free to actuate one of said devices without affecting the signal.

The device can be constructed with the push elements distributed over any distance across the floor forming the alley and run ways or the device can be placed wherever desired, either in the alley way proper or run way proper. Its width may also be varied or the device as a whole can be applied to other uses than with bowling alley ways.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

Having described my invention, what I claim as new and desire to protect by Letters Patent is:—

1. A foul line indicator, comprising, in combination, with a bowling alley way floor, a series of signal actuating devices having actuating elements positioned on the foul line in said floor and spaced sufficiently apart to prevent the operating of more than one of said actuating devices by a ball rolled over said floor and a signal operatively connected with more than one of said actuating devices rendering it necessary to operate more than one of said actuating devices to energize said signal.

2. In combination with a bowling alley way floor, a series of signal actuating devices placed in said floor in proximity thereto, the foul line and a signal connected with more than one of said actuating devices to be operated by the simultaneous depression of more than one of said actuating devices, leaving said signal unaffected by the actuation of only one of the actuating devices.

3. In combination with a bowling alley way floor, a series of signal actuating devices along the foul line in said floor, each of said actuating devices consisting of a push piece adapted to be depressed in said floor by an object passing over the floor, a switch associated with said push piece having circuit closing elements cooperating with said push piece to be closed by the depression of the push piece, said switches being connected in series multiple with an electric circuit, whereby it becomes necessary to depress more than one of said push pieces, to energize said circuit, and a signal and source of electric current connected with said circuit.

4. In combination with a bowling alley way floor, a series of push pieces along the foul line in said floor, said push pieces being adapted to be depressed by an object passing over said floor and switch elements associated with said push pieces and adapted to complete the circuit when more than one of said switches is depressed at a time for the purposes specified.

5. A foul line indicator, comprising, in combination, with a bowling alley floor, two cooperating elements, one a signal and the other a series of push elements assembled along the foul line in said floor and adapted to be depressed by an object coming into contact therewith on said floor, said push elements being so connected with said signal as to operate the latter when more than one of said push elements are depressed simultaneously and ineffective upon said signal when operated singly.

6. An alarm device comprising, in combination, a support, a series of push elements on said support, and an electric signaling circuit having said push elements connected in series therewith, whereby the simultaneous depression of more than one of said push elements is necessary to energize said circuit.

7. In combination with a bowling alley way floor, a series of push elements set in said floor to be depressed by an object passing thereover, and an electric signaling circuit having said push elements connected in series therewith, whereby the simultaneous depression of more than one of said push elements is necessary to energize said circuit.

8. In combination with a floor, circuit closing devices having push elements for effecting their operation exposed on the surface of said floor, and an electric circuit having a multiple connection of series groups of said circuit closing devices, whereby said circuit is adapted to be closed by the depression of all of the push elements of a series of said circuit closing devices and to be uneffected by the closing of a single circuit closing device.

9. In combination with a bowling alleyway floor, a signal, and a plurality of foot operating devices connected with said floor and signal, said devices being arranged so that more than one must be operated simultaneously to actuate said signal.

10. In combination with a bowling alley way floor, a signal, and a plurality of yielding foot operating devices connected with said floor and signal, said devices being arranged so that more than one must be depressed simultaneously to actuate said signal.

11. In combination with a bowling alley way floor, a signal and a multiple signal operating device situated adjacent to said floor and arranged so that a plurality of parts must be actuated by a foot simultaneously to operate said signal but so that said parts remain inactive to effect the operation of said signal by a bowling ball passing over them.

12. A signal comprising, in combination, a support, an alarm and a plurality of push elements on said support connected to said alarm and arranged to require the depression of more than one of said push elements to operate said alarm.

13. A signal, comprising, in combination, a support, an alarm and a plurality of push elements on said support connected to said alarm and arranged to require the depression of more than one of said push elements simultaneously to operate said alarm.

14. A foul line indicator, comprising, in combination, a support, a signal, and a plurality of actuating devices on said support and connected in groups with said signal so as when operated singly to uneffect said signal and when operated in a group to actuate said signal.

15. A foul line indicator, comprising, in combination, a floor, an indicator and groups of actuating devices on said floor arranged not to effect the operation of said indicator unless more than one of the devices constituting a group are operated.

16. In combination with a support, a plurality of push elements arranged sufficiently close together on said support so that the foot can cover more than one at once and means connected with said push elements to be actuated by the simultaneous depression of a plurality of said push elements.

17. In combination with the foul line of a bowling alley including foul indicating means, normally inactive, an actuating mechanism operable at the foul line adapted to indicate a foul only when engaged by an object of a greater area than the contacting surface of a bowling ball.

18. The combination with the foul line of a bowling alley including foul indicating means associated therewith normally inactive for indicating a foul during the act of bowling, said means remaining inoperative by the ball in bowling at all times.

19. The combination with the foul line of a bowling alley including foul indicating means associated therewith normally inactive for indicating a foul, said means being operable by the foot of a bowler and said circuit held open during the rolling of a bowling ball thereover.

20. A device for indicating "fouls" during bowling, including indicating mechanism normally inactive, and rendered active by the closure of an electric circuit, and means for controlling the closing of such circuit, said means being exposed on the foul line of the bowling alley, whereby in bowling said controlling means will be operated only by an object of a greater contacting area than the bowling ball and having an open circuit during the rolling of a bowling ball thereover.

21. In combination with a bowling alley floor, signalling means comprising means for actuating said signal upon the passage of a bowler's foot thereover and for maintaining an open circuit of said signal upon the passage of a bowling ball over said actuating means.

22. In combination with a bowling alley floor, including a signalling means normally inactive and means for operating said signalling means, a portion of which extends along the foul line of said bowling floor, said operating means maintaining an open circuit with said signalling means when a bowling ball passes over the foul line of a bowling floor.

AUGUST J. KEMPIEN.